A. ATWOOD.
Cooking Stove.
No. 95.
Reissued June 5, 1847.
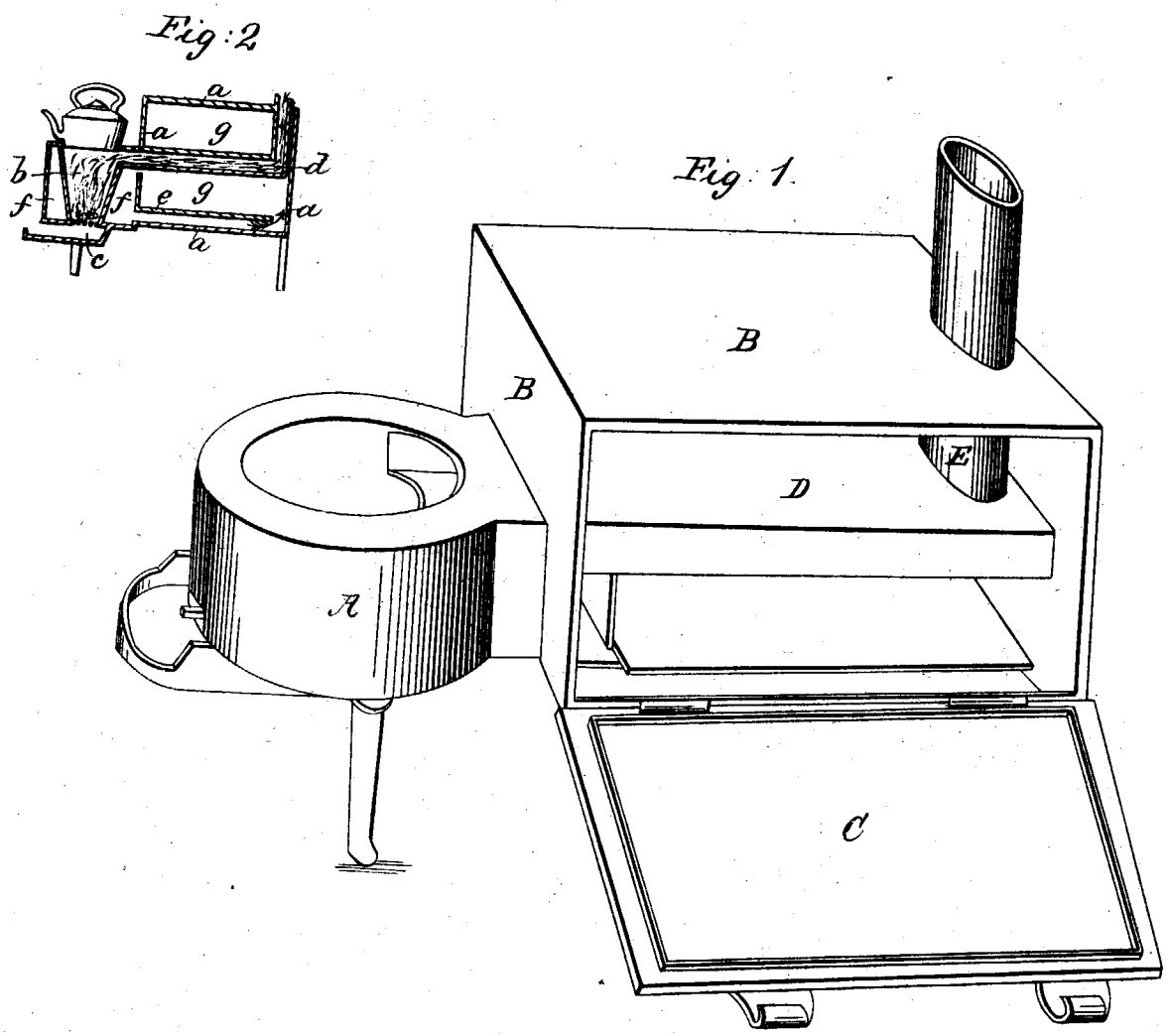
N. PETERS, Photo-Lithographer, Washington, D. C.

UNITED STATES PATENT OFFICE.

ANSON ATWOOD, OF TROY, NEW YORK.

IMPROVED COOKING-STOVE FOR SUMMER.

Specification forming part of Letters Patent No. 815, dated June 30, 1838; Reissue No. 95, dated June 5, 1847.

*To all whom it may concern:*

Be it known that I, ANSON ATWOOD, of Troy, in the county of Rensselaer and State of New York, have invented a new and useful Improvement in Cooking-Stoves; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is a perspective view of my improved stove with the oven-door open to exhibit the inside; Fig. 2, a longitudinal vertical section, and Fig. 3 a cross vertical section, of the same.

The same letters indicate like parts in all, the figures.

The nature of my invention consists, first, in combining and connecting with an oven an air-chamber surrounding or in contact with the fire-chamber, so that the air heated in the chamber shall circulate through and heat the oven; secondly, in providing the oven with an aperture for the discharge of heated air or vapor from the oven; and, third, in carrying the flue which carries off the products of combustion to the exit-pipe into and through the oven, the better to distribute the heat.

In the accompanying drawings, *a* represents a fire-chamber for fuel, (of any desired kind,) which may be made cylindrical or of any other form, the top being open to receive a kettle or any other culinary implement. This chamber is surrounded by an air-chamber, *c*, to receive air through any aperture, which is heated by the fire, and which, after being heated, passes into an oven, *d*, placed back of the fire-place and communicating with the air-chamber *c* by a passage under the oven and an aperture, *e*, near the bottom of the oven. From the upper part of the fire-chamber a flat flue, *f*, extends horizontally into the oven, and running to within a short distance of the back thereof, and provided with a vertical exit-pipe, *g*, near the back end, so that the flame, smoke, and other products of combustion, after passing through the horizontal flat flue to give out its heat to the oven, escape through the pipe *g* into the chimney, the flue *f* being made flat to answer the additional purpose of a shelf in the oven. The hot-air chamber communicates with the oven through the aperture *e* and passes along a space, *j*, formed between the bottom *h* of the oven and the bottom plate, *i*, of the stove. In the exit-pipe, and near the top thereof, there is an aperture, *k*, which may be provided with a valve, for the escape of heated air, gas, vapor, &c., from the oven into the flue, the draft in the exit-pipe aiding the circulation through the oven.

It will be obvious from the foregoing that the aperture or communication between the hot-air chamber surrounding the fire and the oven may be located anywhere, and that it may be made in any manner desired, as the location and form of the aperture may be varied at the pleasure of the constructer so long as it establishes the desired communication between the hot-air chamber and the oven; and it will also be obvious that the aperture for carrying off the gaseous contents of the oven may be located in any part of the flue or exit-pipe, and that it may be used with or without a damper, for the draft in the flue or pipe will always induce a current toward the flue or pipe, which will prevent the escape of smoke into the room. In this way the oven will be heated mainly by the circulation of heated air from the hot-air chamber, and also by radiation from the pipe that passes through it; but it will be manifest that either of these modes may be employed without the other, as the flue *f* may have any other direction. By this arrangement the oven communicates with the hot-air chamber, from which it receives much of its heat, and also with the flue, into which the gaseous contents of the oven may be made to pass, thus establishing a connection between the hot-air chamber and the flue or exit-pipe.

What I claim as my invention, and desire to secure by Letters Patent, is—

1. Combining the hot-air chamber which surrounds or is in contact with the fire-chamber with the oven by means of an aperture, to establish a communication between them for heated air, substantially as described.

2. Connecting the oven with the flue or exit-pipe by means of an aperture, with or without a valve, for the escape of the contents of the oven into the flue, as described, and this I also claim in combination with the described connection between the oven and hot-air chamber, as described, whereby a communication is established between the flue and hot-air chamber through the oven, as described.

3. Extending the flue into the oven, in combination with the further provision for heating the oven by its connection with the hot-air chamber, as described.

ANSON ATWOOD.

Witnesses:

CHS. M. KELLER,

JORDAN L. MOTT.